UNITED STATES PATENT OFFICE 2,068,987

PROCESS OF DISSIPATING FOG

William C. King, Jr., Pittsburgh, Pa.

No Drawing. Application August 23, 1934,
Serial No. 741,182

6 Claims. (Cl. 299—28)

This invention is for a process of dissipating mist or fog by the precipitation thereof. More specifically, the invention dissipates the so-called ground or sea fog which is very dense and extends from the surface of the ground or water up, usually from ten feet to rarely more than one hundred feet, although it sometimes extends much higher. Such a fog exists when the dewpoint and temperature are the same and the wind is calm and the ground or water is cooler than the atmosphere above it.

Mist and fog are produced in regions of varying temperatures and exist in the form of fine or minute drops of water, collectively forming a white opaque or semi-opaque vapor.

Fog generally exists in the lower atmospheric regions and is believed to be promoted by the presence of dust or other solid particles in the air, each particle forming the nucleus for a condensed drop of water. Fog over the sea is said to be induced by salt particles tossed into the atmosphere from the spray of the breaking waves.

It is well known that fog or mist are hazardous to transportation either by land, water or air, and various methods have been attempted heretofore in an endeavor to dissipate fog and restore visibility. All prior methods of which I am aware however, have proven unsuccessful either because of inefficiency or by reason of impracticability.

The principal object of my invention is to provide a process for the dissipation of fog which possesses practicability and which is positive in its operation.

A further object is to provide a process for the dissipation of fog which does not produce any injurious atmospheric or other resulting harmful condition during or subsequent to the practice of the process.

A still further object is to provide a process preventing further fog formation throughout the dissipated region over a substantial period of time.

Additional objects and advantages will become apparent from the following description, setting forth the practice of my invention.

In dissipating fog or mist under my process, I preferably employ a solid medium in powder or finely divided form, which medium is projected into the fog by any suitable means, as for example, by a blower or duster or any other mechanical device capable of distributing the medium over a substantial area, as by means of compressed air.

The means for such projection does not constitute a part of this invention, and is therefore not shown or described in detail, as the same will be readily understood by those skilled in the art.

The solid material to be employed is selected from what are known as inorganic water-absorptive gel-forming media or colloidal clays, capable of directly imbibing water and various solutions by a combination of adsorption, absorption and a chemical reaction.

The best known clay of this group is called bentonite (or wilkinite) and is found as a natural deposit in various sections of North America, principally in Wyoming and California. The raw bentonite is dried, pulverized and reduced to powdered form, and may be purchased as such on the market.

The clays of this class, particularly the bentonites found in Wyoming, are capable of imbibing large quantities of water in proportion to the weight of the material. This property renders these clays particularly adaptable for use in the practice of my invention.

The dry finely divided bentonite is disseminated into the fog over a substantial area by any suitable projecting means as stated. The highly absorptive particles thereof combine with the water of the fog to form a gelatinous mass or gel. Since the fog exists in extremely fine water particles in intimate association, and the particles of clay or bentonite become relatively larger upon taking on one or more of said water particles in forming the gel, the resulting precipitating mass, descending by gravity, forces the fog particles therebeneath downwardly and effectively settles the same to the earth or sea, as the case may be, thereby combining the actions of precipitation and settling for efficient dissipation of the treated region.

This important step in the process of my invention is particularly effective in dissipating fog for aviation purposes, since the projection and dissemination of the medium may be accomplished by a suitable dusting or spreading device on aircraft, whereby the medium may be applied directly over the foggy region desired to be cleared and thereby may act upon the fog entirely throughout its depth.

Said gel gravitates and forms a protective film over the land or water or any object within the region in which fog is being dissipated, thereby minimizing the regeneration of fog in said region over a substantial period of time, by preventing further fog promotion either by dust, salt or other particles.

It is contended that the foggy region treated in this manner, will maintain definite and positive visibility without reformation of fog for several hours. It will be realized that the fog is stationary, that the mixture precipitates out the moisture and that the surrounding fog does not fill in the cleared area.

The gel film resulting from the precipitation is non-injurious, as the clays employed are neither acidic nor basic, but are neutral in their reactions. The said film will dry in the sun and be reduced to the clay in its original state, which incidentally will be beneficial to the soil if said gel falls upon land.

The dissipating value of the said inorganic clays may be increased by the addition of a catalytic agent thereto for the purpose of increasing the absorptive and colloidal properties of the clay. For example, the addition of two per cent of magnesium oxide to bentonite will increase the absorptive and colloidal powers thereof more than twice that of pure bentonite. Other metallic oxides of the alkali group will have similar effect upon bentonite. Likewise certain organic catalysts may be used, as for example, starch, sugar or casein.

It is therefore seen that by the use of a colloidal clay as bentonite, either with or without a catalyst, fog may be efficiently dissipated and dispersed and prevented from reforming in the dissipated region over substantial periods of time, to establish and maintain visibility.

Various changes and modifications are contemplated within the scope of the following claims.

What I claim is:

1. The process of dissipating ground or sea fog consisting in precipitating the fog by disseminating thereinto a dry finely divided water-absorptive gel-forming medium.

2. The process of dissipating ground or sea fog consisting in precipitating the fog by disseminating thereinto a dry finely divided colloidal clay whereby to form a gel with the fog.

3. The process of dissipating ground or sea fog consisting in precipitating the fog by disseminating thereinto a dry finely divided colloidal clay whereby to form a gel with the fog, and settling the fog therebeneath by gravitation of the gel.

4. The process of dissipating ground or sea fog consisting in precipitating the fog by disseminating thereinto dry finely divided bentonite whereby to form a gel with the fog.

5. The process of dissipating ground or sea fog consisting in precipitating the fog by disseminating thereinto dry finely divided bentonite whereby to form a gel with the fog, and settling the fog therebeneath by gravitation of the gel.

6. The process of dissipating ground or sea fog consisting in precipitating the fog by disseminating thereinto dry finely divided bentonite whereby to form a gel with the fog, settling the fog therebeneath by gravitation of the gel, and forming a protective gel film preventing regeneration of fog over a substantial period of time.

WILLIAM C. KING, Jr.